May 20, 1930.  J. H. JAMES  1,759,620
METHOD OF TREATING HYDROCARBONS INCLUDING HYDROCARBON DERIVATIVES
Filed Nov. 5, 1919
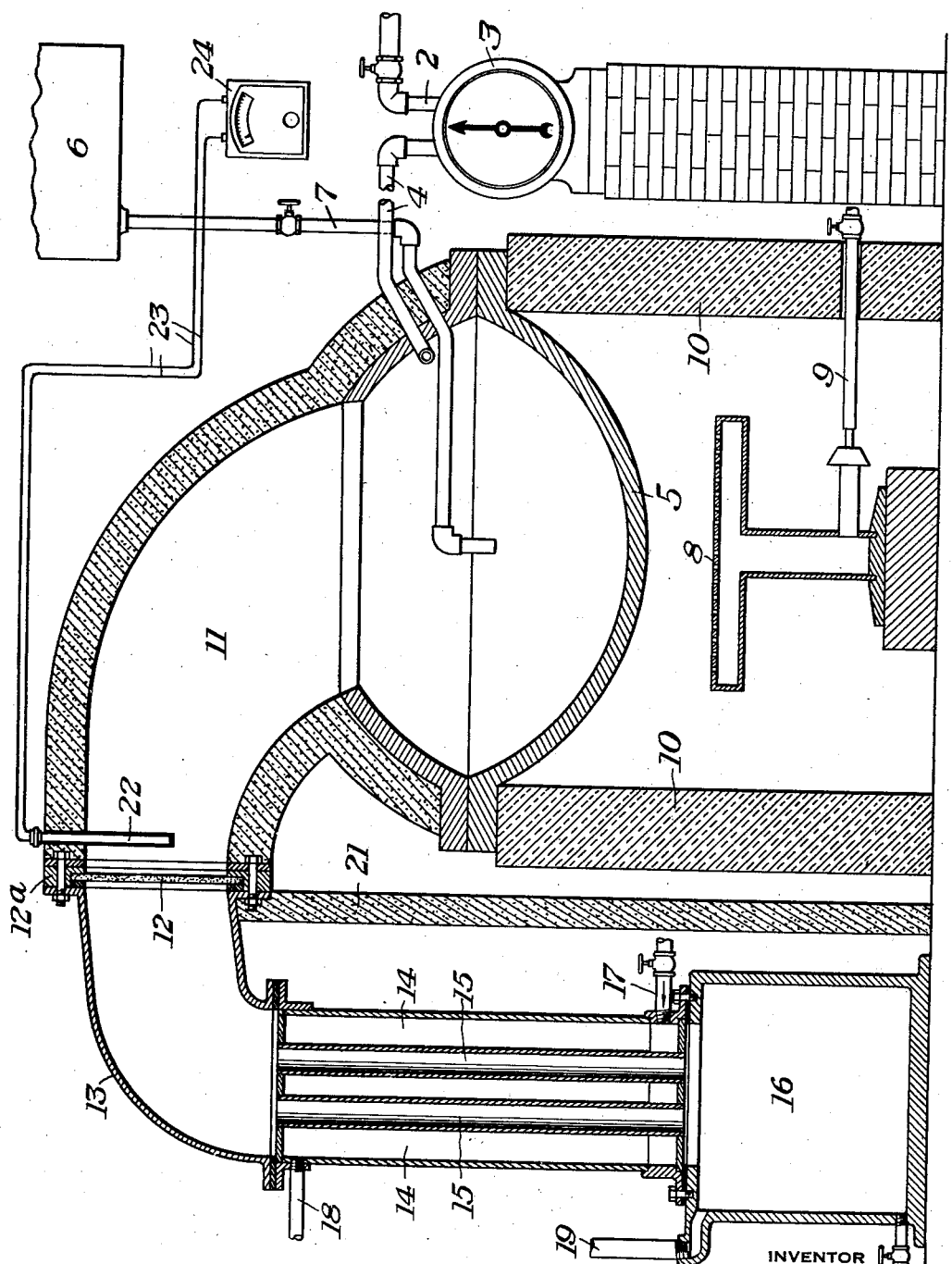
INVENTOR
Joseph H. James
by
Byrnes Stebbins & Parmelee
his attorneys Patented May 20, 1930

1,759,620

UNITED STATES PATENT OFFICE

JOSEPH HIDY JAMES, OF PITTSBURGH, PENNSYLVANIA, ASSIGNOR TO CLARENCE P. BYRNES, TRUSTEE

METHOD OF TREATING HYDROCARBONS INCLUDING HYDROCARBON DERIVATIVES

Application filed November 5, 1919. Serial No. 335,939.

In copending applications, Serial No. 272,567, filed January 22, 1919, which is a continuation in part of original application Serial No. 132,569, filed Nov. 21, 1916, and in United States Patent No. 1,697,653, of January 1, 1929, eventuating upon application Serial No. 281,124, filed March 7, 1919, I have described methods of making acids and also intermediate oxidation products short of acids by partial oxidation methods. In said methods the mineral hydrocarbon in finely divided condition such for example as gaseous or vapor phase condition is mixed with oxygen or an oxygen containing gas, such as air, and passed through a heated reaction zone and preferably in contact with a catalyst, under regulated temperatures, amounts of air, and so forth, the temperature being kept under that of continuous self-sustained combustion and preferably under a red heat.

This application is, in part, a continuation of said co-pending applications and relates to subjecting a hydrocarbon derivative such as the product of my main processes or a part thereof to a further oxidation which may be generally a repeating of the first or main oxidation step. It also relates to subjecting a product containing intermediate oxidation products in the range from alcohols to acids, and each usually containing bodies of different molecular weights, to a further step of oxidation which may consist of mixing the same in finely divded condition with oxygen or an oxygen-containing gas and passing the mixture through a heated conversion zone and preferably in contact with a catalyst. It also relates to my main processes wherein the oxygen in the mixture is materially less than theory requires for the production of the acids; or less than theory requires for forming the desired product.

There are certain advantages presented when I carry out the oxidation of mineral hydrocarbons in successive steps; that is, where the product of the partial oxidation, either with or without removal of the acids present, is subjected to further partial oxidation to tie further oxygen into the material. In the first passage of such material through my partial oxidation process the product usually contains alcohols, aldehydes and acids all of varying molecular weights. The relative percentages of these materials will vary somewhat according to various factors, such as the particular raw material used, the temperature employed, the percentage of air used, the particular catalyst employed, etc. In the present case I preferably aim to carry out the first or main process in such a way as to obtain relatively large percentages of intermediate oxidation products short of the acids and then by further oxidizing of said intermediate products to carry them into acids or tie further oxygen into the material.

In carrying out my process or sub-process, I may employ the same apparatus as shown in some of my copending cases, as shown in the figure of the drawing. In this drawing, 2 represents a valved air pipe through which air is supplied under pressure, 3 a meter for the air, and 4 the pipe leading from the meter ino a heating and mixing vessel 5. 6 represents a vessel containing liquid hydrocarbon, and 7 a valved pipe leading therefrom into the mixing vessel 5. 8 indicates a burner having a valved supply pipe 9, by which the heat may be regulated. 10 represents the walls of the furnace or heating chamber in which the retort or mixing vessel 5 is set, the heated mixture of hydrocarbon vapor and air passing from the mixing vessel through the channel 11 to the catalytic screen 12. This catalytic screen is shown as having a frame 12ª, clamped or bolted between the ends of the channel 11 and the flanged end of the conduit 13, leading to a vertical condenser 14. The products emerging from the catalytic screen pass down through the tubes 15 of the condenser into the vessel 16. 17 represents the valved inlet pipe for water passing into the condenser, and 18 the outlet pipe for the circulating water. The vessel 16 is provided with an outlet 19 for fumes, 20 being the valved pipe by which the condenser products are drawn off. Between the condenser and the vessel 16 and the furnace, I preferably provide an insulating screen 21, or some heat insulator, to keep the heat of the furnace away from the condensing apparatus.

22 represents a pyrometer which is preferably in the form of an electric couple with its wires 23 leading to an external temperature indicator 24.

As regards the catalyst employed, I prefer the complex oxides or compounds of metals having more than one valence. All parts of the complex may consist of oxides of the same metal or of different metals. For example, an excellent catalyst in this connection consists of the so called "blue oxides" of molybdenum, which contain molybdenyl molybdenate, $MoO_2MoO_3$, and molybdenyl molybdenite, and are probably all chemical compounds of two or more oxides of molybdenum representing different states of oxidation. These complexes may be regarded as salts, that is, compounds of one or more basic with one or more acid oxides.

Other complexes of value for such catalysts are chromic chromate, $Cr_2O_3CrO_3$, tungsten tungstate, $WO_2WO_3$, the manganese complexes, the vanadium complexes, etc.

The basic and acid parts of these complexes may be formed from oxides of different metals, in which case, each metal or group of metals used should possess varying valence. Examples of this class are: uranyl molybdate; uranyl molybdite; cobalt molybdate; cobalt molybdite; uranyl vanadate; uranyl vanadite, etc.

The metals whose complexes I prefer to employ as the acid part of the catalyst, since I have found them to be of high activity in this field, are the metals of high melting electronegative low-atomic-volume metals having an atomic weight above 40. Those metals appear on the Lother Meyer diagram of the periodic series beginning on the descending side of the third peak, descending side of the fourth peak, and the descending side of further peaks, developed since the date of this diagram. The class includes the following metals: titanium, vanadium, chromium, manganese, zirconium, niobium, molybdenum, tantalum, tungsten, and uranium. The basic oxides may be the lower oxides of these metals or may be the oxides of iron, copper, nickel, lanthanum, cobalt, thorium, and the eight or nine rare earth metals.

In both acid or basic portions there may, of course, be two or more of these combined.

In carrying out the process material in finely divided condition is mixed with air in proper proportions and passed with a definite velocity through the catalytic material which is maintained within a definite range of temperature below that of self-sustained compound combustion and preferably below any temperature at which the catalyst will glow or show color from its rising temperature. In the preferred form heat is continuously supplied to the material, for example by applying a regulated heat to effect the vaporization of the liquid hydrocarbon as shown in the drawings and above described, but the zone of reaction should be maintained below that of self-sustained combustion and within the temperature range where intermediate oxidation products short of acids are formed.

The process may be carried out using less air in the mixture than theory requires to make aldehyde fatty acids and when this is done a temperature may be used which is higher than that used in producing such aldehyde acids.

The following example will serve to illustrate my method under certain conditions. The raw material used was gas oil made from Pennsylvania petroleum, which showed the following on distillation:

| | Per cent |
|---|---|
| Below 250° C. | Zero |
| Below 300° C. | 32.5 |
| Below 350° C. | 62. |
| Residue | 5.5 |

During the run, the oil gas fed at an average rate of slightly over 5 liters every ½ hour; the air was fed at an average of about 4.4 cubic feet per minute, and the temperature in the catalytic zone was maintained at a temperature varying from about 340° to 470° C. The total oil fed was 92.5 liters, the total recovery with one scrubber was 71.5 liters giving a yield of 76.9% of product having a specific gravity of .866.

By the well known method of determining aliphatic alcohols which consists in measuring the hydrogen evolved on heating with soda lime and caustic potash, it was found that the product contained approximately 33% of alcohols. The aldehyde fatty acids formed at the same time amount to about 17%. The remainder of the products consists of aldehydes and unchanged hydrocarbons. The determination of aldehydes and aldehyde alcohols was not made, but it was shown qualitatively that there was a considerable quantity of aldehyde bodies present, aside from the aldehyde fatty acids.

If the intermediate products short of acids and in this case containing a large percent of alcohols was to be further oxidized, I may take the mixture thus produced and pass it through the apparatus in the same general manner as before. The following is an example of such second step where the further oxidation is carried out in the vapor phase:

The raw material made was the liquid product produced as above described containing aliphatic aldehyde alcohols, aldehydes, aldehyde fatty acids, and some unchanged aliphatic hydrocarbons. The temperature was from about 340° C. to 370° C. The oil feed was about 5.33 liters per one-half hour. The air feed was about 4.35 cubic feet per minute. The total oil fed was 32 liters and the product recovered with one scrubber in series with the condenser was 26.7 liters, giving a yield of 83.4%, the product having a specific gravity of .90. The aldehyde fatty acids in the product amounted to 55.6%.

In this second step the alcohols of different molecular weights and the aldehydes of different molecular weights were further oxidized and the percentage of acids increased.

The advantages of my invention will be apparent to those skilled in this art since a catalytic method is provided by which acids or later oxidation products may be made from intermediate products short of acids, such as alcohols and aldehydes of different molecular weights; and also a two-step method is provided by which intermediate oxidation products short of acids are made and either with or without removal of the acids the product is further oxidized, preferably by a repetition of the catalytic method above referred to.

Changes may be made in the apparatus as well as in the mineral hydrocarbons used and the interdependent conditions may be varied within the lines above indicated; by the term "mineral hydrocarbons" I intend to cover and include crude mineral oil or shale oil or their distillates, products or derivatives or similar products or derivatives of the low temperature distillation of lignites or coals, whether the products are of the saturated or unsaturated type, or of both. The material may also contain some cyclic hydrocarbons or ring compounds and the hydrocarbon derivatives may be made or obtained by other methods. By the term "finely divided" herein I intend to include the vapor form and the gas form.

I do not cover the preferred first or main step by itself in this application as the product and this step in the process are covered in my co-pending case Ser. No. 272,567 and Patent No. 1,697,653, above referred to.

I claim:

1. In the treatment of mineral hydrocarbons, the step consisting in subjecting a liquid mineral hydrocarbon product containing oxygenated hydrocarbons of different molecular weights to further oxidation treatment and chemically tying further oxygen thereinto under conditions preventing complete oxidation of the major portion of the material treated.

2. In the treatment of mineral hydrocarbons, the step consisting in subjecting a liquid hydrocarbon containing material proportions of alcohols and aldehyde-like bodies of different molecular weights to further oxidation and tying further oxygen thereinto under conditions preventing complete oxidation of the major portion of the material treated.

3. In the treatment of mineral hydrocarbons, the step consisting in subjecting a mixture of hydrocarbon derivatives of different molecular weights and containing combined oxygen to further oxidation to convert at least a portion thereof into acids.

4. In the treatment of mineral hydrocarbons, the steps consisting of subjecting a mineral hydrocarbon product of different molecular weights and containing combined oxygen to a further oxidation treatment while mixed with air or an oxygen containing gas under conditions preventing complete oxidation of the major portion of the material treated.

5. In the treatment of mineral hydrocarbons, the steps consisting of subjecting a mineral hydrocarbon product of different molecular weights and containing combined oxygen to a further oxidation treatment while mixed with air or an oxygen containing gas in the presence of a catalyst under conditions preventing complete oxidation of the major portion of the material treated.

6. In the treatment of mineral hydrocarbons, the steps consisting of subjecting a mineral hydrocarbon product of different molecular weights and containing combined oxygen, to a further oxidation treatment while mixed with an oxygen containing gas in the pressence of a catalyst containing a compound of a high-melting point low-atomic-volume metal.

7. In the treatment of mineral hydrocarbons, the steps consisting of passing a mixture of finely divided mineral hydrocarbon and an oxygen-containing gas through a heated conversion zone and maintaining the conditions to give a material percentage of products short of acids, and then subjecting the product to further oxidation under conditions preventing complete oxidation of the major portion of the material treated.

8. The method which consists in subjecting mineral hydrocarbons to partial oxidation while in finely divided condition, producing partial oxidation products of different molecular weights, and then further oxidizing at least a part of said product under conditions preventing complete oxidation of the major portion of the material treated.

9. The steps consisting of partially oxidizing mineral hydrocarbons while in finely divided condition into a product containing a material percentage of alcohols, and then oxidizing at least a part of the product including said alcohols under conditions preventing complete oxidation of the major portion of the material treated.

10. The method which consists in subjecting mineral hydrocarbons to partial oxidation while in finely divided condition, and then subjecting at least a part of the product while in finely divided condition to further oxidation by passing it with an oxygen-containing gas through a heated reaction zone under conditions preventing complete oxidation of the major portion of the material treated.

11. The method which consists in subjecting mineral hydrocarbons to partial oxidation while in finely divided condition, and then subjecting at least a part of the product while in finely divided condition to further oxidation by passing it with an oxygen-containing gas through a heated reaction zone in contact with a catalyst under conditions preventing complete oxidation of the major portion of the material treated.

12. In the process of making partial combustion products, the steps consisting of treating a partial oxidation product mixture containing aldehydes by mixing the same in finely divided condition with an oxygen-containing gas, and passing the same through a reaction zone under conditions preventing complete oxidation of the major portion of the material treated.

13. In the process of making partial combustion products, the steps consisting of treating a partial oxidation product mixture containing aldehydes by mixing the same in finely divided condition with an oxygen-containing gas, and passing the same through a reaction zone in contact with a catalyst under conditions preventing complete oxidation of the major portion of the material treated.

14. In the process of making partial combustion products, the steps consisting of treating a partial oxidation product mixture containing aldehydes by mixing the same in finely divided condition with an oxygen containing gas, passing the same through a reaction zone in contact with a catalyst, and maintaining the catalyst at a temperature below red heat.

15. In the treatment of mineral hydrocarbons, the step consisting of mixing a mineral hydrocarbon product with an oxygen-containing gas to an amount substantially less than theory requires for the production of aldehyde fatty acids, and passing the same through a heated reaction zone.

16. In the treatment of mineral hydrocarbons, the step consisting of mixing a mineral hydrocarbon product with an oxygen containing gas to an amount substantially less than theory requires for the production of aldehyde fatty acids, and passing the same through a heated reaction zone in the presence of a catalyst.

17. The method of treating a liquid mixture of hydrocarbons containing alcohols and aldehyde-like bodies having artificially-introduced chemically-combined oxygen, consisting in subjecting the same to further partial oxidation under conditions preventing complete oxidation of the major portion of the mixture.

18. The method consisting of subjecting mineral hydrocarbons to partial oxidation while in finely divided condition, condensing oxygenated hydrocarbons from the exit gas stream, removing a part of the condensate, and then chemically tying further oxygen into the remainder.

19. In the treatment of hydrocarbons the steps consisting of mixing an aliphatic hydrocarbon in vapor or gaseous phase with an oxygen-containing gas to an amount less than theory requires for the production of acids and passing the mixture through a heated conversion zone at a temperature below that of continuous self-sustained combustion.

20. In the treatment of hydrocarbons the steps consisting of mixing an aliphatic hydrocarbon in vapor or gaseous phase with an oxygen-containing gas to an amount less than theory requires for the production of acids, and passing the mixture through a heated conversion zone at a temperature below a red heat.

21. In the treatment of hydrocarbons the steps consisting of mixing an aliphatic hydrocarbon in vapor or gaseous phase with an oxygen-containing gas to an amount less than theory requires for the production of acids and passing the mixture through a heated conversion zone at a temperature below that of continuous self-sustained combustion and interadjusting the variable conditions to produce a partial oxidation product in which other bodies predominate over the acids.

22. In the treatment of hydrocarbons the steps consisting of mixing an aliphatic hydrocarbon in vapor or gaseous phase with an oxygen-containing gas to an amount less than theory requires for the production of acids, and passing the mixture through a heated conversion zone at a temperature below a red heat, and interadjusting the variable conditions to produce a partial oxidation product in which other bodies predominate over the acids.

23. In the treatment of hydrocarbons the steps consisting of mixing an aliphatic hydrocarbon in vapor or gaseous phase with an oxygen-containing gas to an amount less than theory requires for the production of acids, and passing the mixture in contact with a catalyst at a temperature below that of continuous self-sustained combustion.

24. In the treatment of hydrocarbons the steps consisting of mixing an aliphatic hydrocarbon in vapor or gaseous phase with an oxygen-containing gas to an amount less than theory requires for the production of acids, and passing the mixture in contact with a catalyst at a temperature below a red heat.

25. In the process of synthetically forming an aliphatic partial oxidation product, the steps consisting of forming a mixture of aliphatic hydrocarbon and oxygen containing constituents in gaseous phase having an oxygen content less than theory requires for forming the desired product, and passing the mixture through a hot reaction zone under conditions which chemically tie oxygen into the aliphatic hydrocarbon containing constituents.

26. In the process of synthetically forming an aliphatic partial oxidation product, the steps consisting of forming a mixture of aliphatic hydrocarbon and oxygen containing constituents in gaseous phase having an oxygen content less than theory requires for forming the desired product, and passing the mixture through a hot reaction zone in contact with a catalyst under conditions which chemically tie oxygen into the aliphatic hydrocarbon containing constituents.

27. In the process of synthetically forming an aliphatic partial oxidation product, the steps consisting of forming a mixture of aliphatic hydrocarbon and oxygen containing constituents in gaseous phase having an oxygen content less than theory requires for forming the desired product, and passing the mixture through a hot reaction zone at a temperature below that of continuous self-sustained combustion under conditions which chemically tie oxygen into the aliphatic hydrocarbon containing constituents.

28. In the process of synthetically forming an aliphatic partial oxidation product, the steps consisting of forming a mixture of aliphatic hydrocarbon and oxygen containing constituents in gaseous phase having an oxygen content less than theory requires for forming the desired product, and passing the mixture through a hot reaction zone in contact with a catalyst at a temperature below that of continuous self-sustained combustion under conditions which chemically tie oxygen into the aliphatic hydrocarbon containing constituents.

29. In the process of synthetically forming an aliphatic partial oxidation product, the steps consisting of forming a mixture of aliphatic hydrocarbon and oxygen containing constituents in gaseous phase having an oxygen content less than theory requires for the production of oxygenated organic acids, and passing the mixture through a hot reaction zone under conditions which chemically tie oxygen into the aliphatic hydrocarbon containing constituents.

30. In the process of oxidizing an oxygen-containing aliphatic hydrocarbon derivative of more than one carbon atom, the step consisting of passing the same in vapor or gaseous phase with an oxygen-containing gas in contact with a compound of high-melting-point low-atomic volume metal at a temperature below a red heat.

31. In the process of oxidizing an oxygen-containing aliphatic hydrocarbon derivative of more than one carbon atom, the step consisting of passing the same in vapor or gaseous phase with an oxygen-containing gas in contact with a catalyst at a temperature below a red heat.

32. In the process of oxidizing an oxygen-containing aliphatic hydrocarbon derivative of more than one carbon atom, the step consisting of passing the same in vapor or gaseous phase with an oxygen-containing gas in contact with a catalyst at a temperature below a red heat for a fraction of a second.

33. In the process of oxidizing an oxygen-containing aliphatic hydrocarbon derivative of more than one carbon atom, the step consisting of passing the same in vapor or gaseous phase with an oxygen-containing gas in contact with a catalyst containing compounds of a plurality of metals of the high-melting-point low-atomic volume type at a temperature below that of continuous self-sustained complete combustion.

34. In the process of oxidizing an oxygen-containing aliphatic hydrocarbon derivative of more than one carbon atom, the step consisting of passing the same in vapor or gaseous phase with an oxygen-containing gas in contact with a catalyst containing an oxide of a high-melting-point low-atomic-volume metal at a temperature below that of continuous self-sustained complete combustion.

35. In the process of oxidizing an oxygen-containing aliphatic hydrocarbon derivative of more than one carbon atom, the step consisting of passing the same in vapor or gaseous phase with an oxygen-containing gas in contact with a catalyst containing a compound of a metal appearing on the down slope of the third and further peaks of the periodic series at a temperature below that of continuous self-sustained complete combustion.

36. In the process of oxidizing an oxygen-containing aliphatic hydrocarbon derivative of more than one carbon atom, the steps consisting of mixing the same in vapor or gaseous phase with an oxygen-containing gas, and passing the mixture through a heated reaction zone at a temperature below that of continuous self-sustained complete combustion.

37. In the process of oxidizing an oxygen-containing aliphatic hydrocarbon derivative of more than one carbon atom, the steps consisting of mixing the same in vapor or gaseous phase with an oxygen-containing gas, and passing the mixture through a heated reaction zone at a temperature below a red heat.

38. In the process of oxidizing an oxygen-containing aliphatic hydrocarbon derivative of more than one carbon atom, the steps consisting of mixing the same in vapor or gaseous phase with an oxygen-containing gas to an amount less than that required for complete oxidation, and passing the mixture through a heated reaction zone at a temperature below a red heat.

39. In the process of oxidizing an oxygen-containing aliphatic hydrocarbon derivative of more than one carbon atom, the steps consisting of mixing the same in vapor or gaseous phase with an oxygen-containing gas to an amount less than theory requires for the production of aldehyde fatty acids, and passing the mixture through a heated reaction zone at a temperature below a red heat.

In testimony whereof, I have hereunto set my hand.

JOSEPH HIDY JAMES.